March 25, 1969     L. D. ELY     3,435,199
ILLUMINATED VANITY MIRROR
Filed Oct. 5, 1966
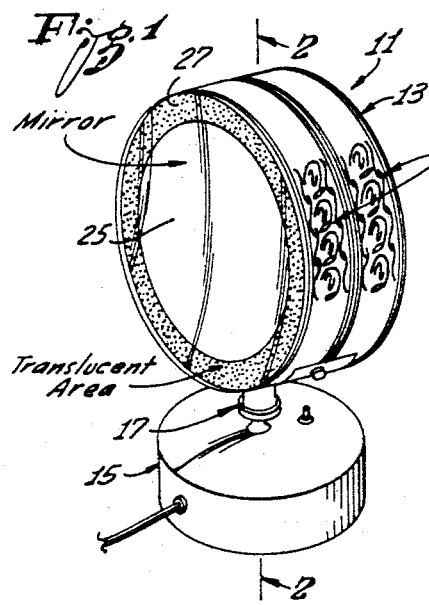
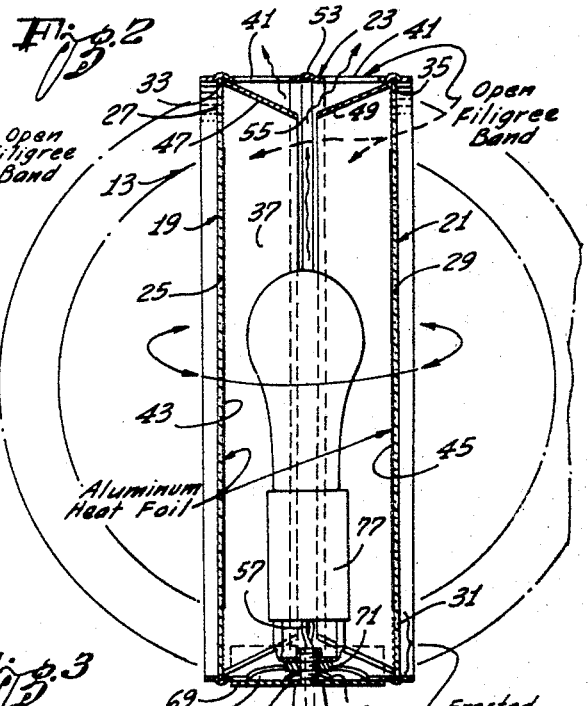
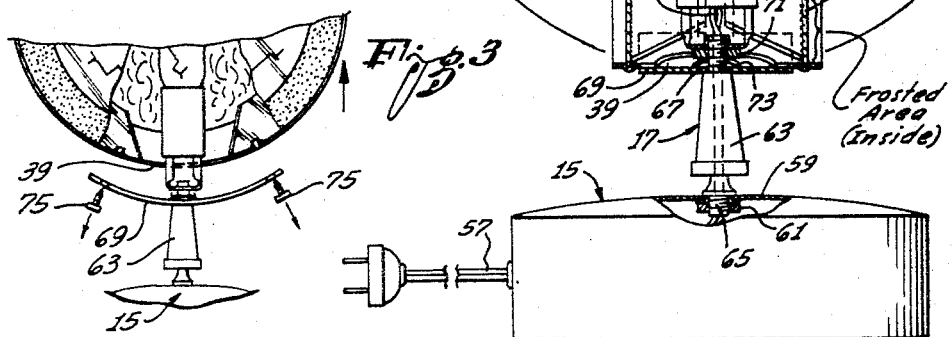
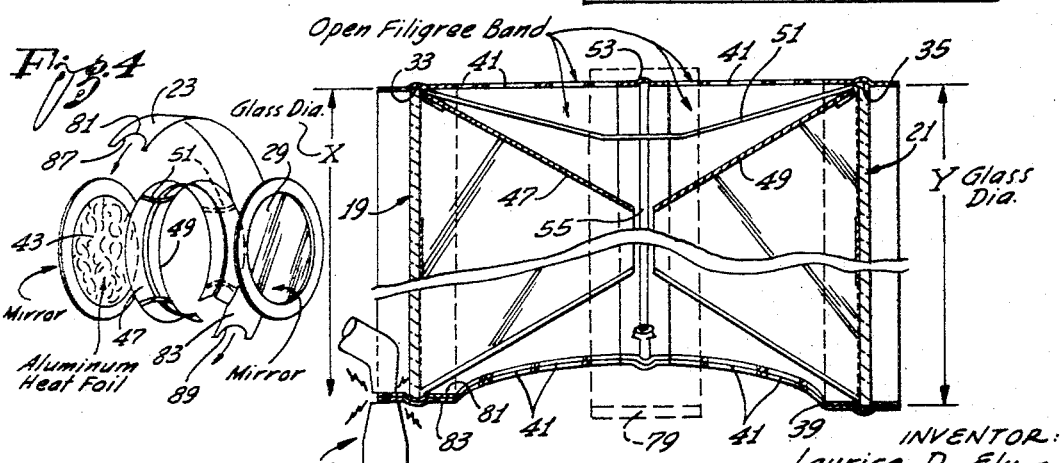
INVENTOR:
Laurice D. Ely
ATTORNEY

United States Patent Office 3,435,199
Patented Mar. 25, 1969

3,435,199
ILLUMINATED VANITY MIRROR
Laurice D. Ely, West Los Angeles, Calif., assignor to Casco Products Corp., a corporation
Filed Oct. 5, 1966, Ser. No. 584,539
Int. Cl. F21v 33/00
U.S. Cl. 240—4.2                                    6 Claims

ABSTRACT OF THE DISCLOSURE

An illuminated vanity mirror including a base and a drum connected to the base. The drum has an opaque section and a translucent section with a light source mounted within the drum. The drum can be pivoted relative to the base without twisting of the electrical conductors which extend through the base to the light source.

---

This invention relates to a lamp and more particularly to a lighting fixture having an attractively illuminated mirror portion. Thus, the lighting fixture serves both as a lamp and as an attractively illuminated mirror.

In illuminating a mirror, it has been found desirable both from a practical and an aesthetic point of view to provide illumination generally in the plane of the mirror. Preferably, the maximum intensity illumination should be at the periphery of the mirror. Such light should be diffuse or indirect so that it will not cause a glare or otherwise be uncomfortable to the eyes of the user of the mirror.

According to the present invention, these desirable features are achieved by providing a lighting fixture having a mirror section with an outwardly reflecting surface and a translucent section adjacent the mirror section. Illuminating means are provided behind the mirror. Light from the illuminating means is transmitted through the translucent section to very adequately and aesthetically illuminate the mirror with a soft glow which is not uncomfortable to the eyes of the user. In the preferred form of construction, the translucent section extends completely around the periphery of the mirror section to completely illuminate the entire periphery of the mirror.

More particularly, the lighting fixture of this invention includes a hollow drum secured to a base, with the hollow drum having a mirror section with an outwardly directed reflective mirror surface and a translucent section adjacent the mirror section. Illuminating means, such as an electric incandescent lamp or fluorescent tube are mounted within the drum to direct light through the translucent section to provide a source of diffuse light adjacent the reflective mirror surface. To obtain maximum utilization of the light from the illuminating means, reflector means are provided within the drum for directing the light from the illuminating means through the translucent section. Preferably, such reflective means includes a conical section extending along the outer periphery of the translucent section.

One of the problems inherent in enclosing a light and particularly an incandescent bulb within an enclosure is dissipation of the heat produced by such lamp. According to the present invention, overheating of the fixture is prevented by perforating the peripheral wall of the drum to allow air circulation therethrough. Preferably, the perforations form an attractive and ornate pattern on the drum. The band may be, for example, a filigree band. To prevent the lamp from providing direct illumination through the perforations of the peripheral wall of the drum, mask means are provided. Such masking may be accomplished, for example, by offsetting the conical reflector and the perforations in the peripheral wall of the drum so that no direct path for light is provided. Accordingly, the only light that may be transmitted from the lamp to the exterior of the drum through the perforations is a very low-intensity indirect light.

Preferably, the lighting fixture includes two mirror sections and two translucent sections arranged in spaced back-to-back relationship and forming generally opposed walls or wall members of the drum. The second mirror section may be curved to provide a magnification of the image reflected thereby.

To make the lighting fixture more versatile, the drum is preferably mounted for rotation relative to the base. This permits turning of the mirror section to the desired angle relative to the user and also permits sequential use of both of the mirror sections when two mirror sections are provided. A problem that is encountered in connection with relative rotation between the drum and the base is twisting of the electrical conductors that extend through and from the base to the electric lamp mounted within the drum. Such twisting of the electrical conductors is undesirable from the point of view of safety. To avoid twisting of the conductors, the drum is connected to the base by a tubular stem through which the conductor passes. The connecting means also includes a bracket rotatably mounted on the stem and directly rigidly fastened to the drum. Thus, the bracket and drum are rotatable relative to the stem, base, and conductors within the stem.

In order that the electric lamp within the drum can be replaced when it burns out, it is essential that the drum or a portion thereof be separable from the remaining portion of the lighting fixture. In the preferred embodiment of this invention, the electric lamp is incandecent and the drum is provided with a circular aperture in the lower portion of the peripheral wall thereof. The incandescent lamp is mounted in a socket at the upper end of the stem and is receivable through such aperture. The aperture permits removal of the drum from the remainder of the lighting fixture to allow changing of the light bulb and cleaning of the interior of the fixture.

Another feature of this invention is the particular drum construction and the manner of fabricating same. It is important that the drum be easily fabricated and that no close tolerances be required in connection with the drum construction. This is accomplished by positioning the two opposed walls or mirror and translucent sections of the drum in generally parallel spaced back-to-back relationship and wrapping a band having internal circumferential extending grooves around the two walls, within the walls being snugly received in the circumferentially extending grooves. The band is wrapped tightly around the two walls and is temporarily retained in position by an elastic member or other suitable device. The end portions of the band are brought into overlapping relationship and secured together as by spot welding. The resulting structure is very sturdy and the two wall sections are rigidly supported by the band. Another primary advantage of this method of construction is that the two walls need not be produced at close tolerances. The band, which is preferably metal, is sufficiently flexible to accommodate different diameters on the part of the two mirrors.

The invention, both as to its organization and method of operation, together with further features and advantages thereof, may best be understood by reference to the following description taken in connection with the accompanying drawing in which:

FIG. 1 is a perspective view of a lighting fixture constructed in accordance with the teachings of this invention;

FIG. 2 is an enlarged sectional view taken along line 2—2 of FIG. 1;

FIG. 3 is a fragmentary view partially in section illustrating how the drum is secured to and removed from the base of the lighting fixture;

FIG. 4 is an exploded perspective view of the drum; and

FIG. 5 is an enlarged sectional view through the drum similar to FIG. 2 illustrating the preferred manner of fabricating the drum.

Referring to the drawing and in particular to FIG. 1 thereof, reference numeral 11 designates a lighting fixture constructed in accordance with the teachings of this invention. Generally, the lighting fixture includes a drum 13, a base 15, and connecting means 17 for connecting the drum to the base.

As best seen in FIG. 2, the drum 13 includes first and second generally opposed spaced generally parallel walls 19 and 21 and a peripheral wall or band 23. The walls 19 and 21 are preferably circular, although various configurations may be employed.

The wall 19 is preferably constructed of glass and has an opaque mirror section 25, which is preferably circular, and a translucent or diffusing section 27 which is preferably annular and completely surrounds the mirror section. If desired, the translucent section 27 may be constructed of plastic or other suitable material. The mirror section 25 has the usual outwardly directed reflective mirror surface and the translucent section is preferably constructed of a frosted glass. The wall 21 may be a conventional metal, plastic, or other suitable material for forming a backing for the drum 13. Preferably, however, the wall 21 has a mirror section 29 and a translucent section 31 similar to the sections 25 and 27, respectively. If desired, one or both of the mirror sections 25 and 29 may be convex or otherwise appropriately shaped to provide a desired degree of magnification.

The peripheral wall 23 has a pair of circumferentially extending internal grooves 33 and 35 into which the peripheral edges of the translucent sections 27 and 31, respectively, are received. The peripheral wall 23 tightly frictionally engages the outer peripheries of the translucent sections 27 and 31 to firmly retain them in the position shown in FIG. 2.

An electric incandescent lamp 37 is suitably mounted at the upper end of the connecting means 17. The peripheral wall 23 is provided with a relatively large diameter aperture 39 in the lower portion thereof through which the lamp 37 can be received.

The peripheral wall 23 has a plurality of perforations or ports 41 extending therethrough to permit ambient air to flow through the drum 13 to dissipate the heat produced by the lamp 37. As best seen in FIG. 1, the peripheral wall 23 is preferably an ornate open filigree band. Heat shields 43 and 45 are suitably secured to the rear faces of the walls 19 and 21, respectively. Any reflective material, such as aluminum heat foil, may be used for the heat shields 43 and 45.

To make maximum utilization of the light emitted by the lamp 37, a pair of frusto-conical reflectors 47 and 49 are provided within the drum 13. The reflectors 47 and 49 direct the light from the lamp 37 through the annular translucent sections 27 and 31. The reflectors 47 and 49 preferably extend completely around the periphery of the translucent sections 27 and 31, respectively, and are interconnected by a plurality of metal strips 51 (FIGS. 4 and 5). The reflectors 37 and 49 may be secured to the peripheral wall 23 and/or the translucent sections 27 and 31 by a suitable adhesive.

The perforations 41 in the peripheral wall 23 extend therearound in several circular rows which are spaced by an unperforated annular strip 53. The reflectors 47 and 49 are arranged within the drum 13 so as to mask the rows of perforations 41 as shown in FIGS. 2 and 5. Thus, the reflectors 47 and 49 serve as light baffles in preventing the lamp 37 from providing direct illumination through the perforations 41. Similary, the reflectors 47 and 49 are spaced by an annular gap or aperture 55 which in turn is masked by the imperforate strip 53 of the peripheral wall 23. Thus, ventilation air is allowed to flow through the drum 13, but the lamp 37 cannot provide direct illumination through the perforations 41.

The base 15 is preferably hollow as indicated in FIG. 2 and has a pair of electrical conductors 57 mounted thereon and extending therethrough. The connecting means 17 may be secured to an upper wall 59 of the base 15 by a nut 61 or, if desired, the connecting means 17 may be mounted on both the upper wall 59 and the lower wall of the base.

The connecting means 17 includes a tubular stem 63 through which the conductors 57 extend. The stem 63 has a threaded end portion 65 to which the nut 61 is secured. The stem 63 has an annular shoulder 67 adjacent the upper end thereof on which a bracket 69 is mounted. The bracket 69 is curved to conform to the curvature of the peripheral wall 23 as shown in FIG. 3 and is retained on the shoulder 67 by a nut 71 and a Belleville washer 73. Thus, the bracket 69 is rotatable relative to the stem 63 and the base 15 about a generally vertical axis, the resistance to such rotation being adjustable by tightening or loosening of the nut 71. As shown in FIG. 3, a pair of screws 75 may be utilized to rigidly secure the drum 13 to the bracket 69. Thus, the drum 13 and the bracket 69 are rotatable relative to the stem 63 and the base 15.

A standard incandescent light socket 77 is suitably secured to the upper end of the stem 63. The lamp 37 is screwed into the light socket 77 in the conventional manner. The conductors 57 extend entirely through the stem 63 and are suitably secured to the socket 77 to provide electrical power to the lamp 37. It is apparent that the drum 13 and the bracket 69 may be rotated without twisting or imparting any movement to the conductors 57 or to the lamp 37.

The construction described hereinabove is particularly advantageous in providing both an ornamental lamp and a mirror. The light passing through the translucent sections 27 and 31 is indirect and is not uncomfortable to the eyes of the user of the mirror. The drum 13 is adequately ventilated and the ventilation perforations are adequately masked to prevent direct illumination from extending through such perforations. The lamp is quite versatile in that the drum 13 may be rotated without any twisting of the electrical conductors extending to the incandescent bulb.

The drum construction illustrated is preferred because the walls 19 and 21 are rigidly supported by the peripheral wall 23 and conversely the walls 19 and 21 impart rigidity to the otherwise resilient peripheral wall 23. In addition, the diameters of the walls 19, 21 may vary, for example, plus or minus $1/16$ of an inch without reducing the rigidity of the structure.

The preferred method of fabricating the drum 13 is to suitably support the walls 19 and 21 and then wrap the peripheral wall or band 23 tightly therearound with the grooves 3 and 35 receiving the walls 19 and 21, respectively. The band 23 is held tightly around the walls 19 and 21 by a suitable retaining band 79 (FIG. 5) and the end portions 81 and 83 of the band 23 are caused to overlap as shown in FIG. 5. The end portions 81 and 83 are then secured or bonded together as by a suitable welding apparatus 85 which spot welds such end portions to form the rigid drum 13. Of course, the reflectors 47 and 49 and the heat shields 43 and 45 should preferably be secured to the walls 19 and 21 prior to wrapping the band 23 therearound. Finally, the retaining band 79 is removed. Preferably, the end portions 81 and 83 have precut arcuate grooves 87 and 89, respectively, which together define the aperture 39 after the end portions of the drum are spot welded.

Many changes, modifications and substitutions may be made by one having ordinary skill in the art without necessarily departing from the spirit and scope of this invention.

What is claimed is:

1. In a lighting fixture, the combination of:
first and second wall members, each of said wall members having front and rear faces and a peripheral edge, said wall members being arranged with said rear faces thereof being in generally confronting relationship;
peripherally extending band means tightly frictionally engaging said peripheral edges of said wall members and surrounding said wall members for securing said wall members together, said wall members and said band means defining a cavity therebetween;
illuminating means within said cavity;
said first wall member including a light diffusing section through which light from said illuminating means can pass;
said band means having a plurality of perforations extending therethrough to permit ventilation of said cavity; and
apertured reflector means for directing light through said diffusing section, the aperture in said reflector means being offset from the perforations in said band means to substantially preclude said illuminating means from providing direct illumination through said perforations in said band.

2. In a lighting fixture, the combination of:
a base;
a hollow drum including first and second spaced end walls and a peripheral wall, said first end wall having substantiallly an opaque section and an adjacent translucent section;
drum mounting means having an opening therein for mounting said drum on said base for pivotal movement relative thereto about a pivotal axis which extends through said peripheral wall of said drum;
electrically energizable illuminating means within said drum for directing light through said translucent section to the exterior of said drum;
means for mounting said illuminating means on said base in fixed relationship thereto; and
electrical conductor means extending through said base and said opening of said drum mounting means for supplying electrical energy to said illuminating means whereby said hollow drum can be pivoted about said pivotal axis to change the spatial location of said first peripheral wall without turning of said base or twisting of said electrical conductor means.

3. A combination as defined in claim 2 wherein said peripheral wall has ventilation perforations therethrough to facilitate cooling of said illuminating means by ambient air and including mask means for preventing said illuminating means from providing direct illumination through said perforations.

4. In a lighting fixture, the combination of:
a base;
a hollow drum including a wall having a substantially opaque section and an adjacent translucent section;
electrically energizable illuminating means within said drum for directing light through said translucent section to the exterior of said drum;
at least substantially rigid means including a tubular stem mounted on said base for securing said illuminating means to said base;
electrical conductor means extending through said base and said tubular stem for supplying electrical energy to said illuminating means; and
means for mounting said drum on said tubular stem for rotation relative to said base and said electrical conductor means about a pivotal axis which is positioned to permit changing of the spatial position of the wall by pivoting of the drum about said axis.

5. A combination as defined in claim 4 wherein said last mentioned means includes a bracket mounted on said tubular stem for rotation relative thereto and means for securing said drum to said bracket, said tubular stem being rigidly mounted on said base.

6. A combination as defined in claim 4 wherein said opaque section of said wall includes a mirror located centrally of said wall having its reflective surface directed outwardly and said adjacent translucent section is in the form of a peripherally extending region at least substantially completely surrounding said mirror.

References Cited

UNITED STATES PATENTS

| | | | |
|---|---|---|---|
| 1,447,584 | 3/1923 | Leech et al. | 240—8.22 |
| 1,761,393 | 6/1930 | Hoegger | 240—4.2 |
| 1,957,763 | 5/1934 | Dupler | 240—10.1 |
| 1,979,542 | 11/1934 | Hauser et al. | 240—4.2 |
| 2,738,414 | 3/1956 | Davis et al. | 240—8.22 |
| 2,878,371 | 3/1959 | Hanlin | 240—47 |
| 3,275,816 | 9/1966 | Brunger | 240—8.22 |

NORTON ANSHER, *Primary Examiner.*

R. M. SHEER, *Assistant Examiner.*

U.S. Cl. X.R.

240—10.1, 47